United States Patent [19]
Hicks

[11] 3,885,539
[45] May 27, 1975

[54] PRECOMBUSTION CATALYST DEVICE FOR USE WITH AN INTERNAL COMBUSTION ENGINE EMPLOYING A VAPORIZABLE LIQUID FUEL AND AN ENGINE UTILIZING SUCH A DEVICE

[75] Inventor: J. Byron Hicks, Colts Neck, N.J.

[73] Assignee: Hydro-Catalyst Corp., Colts Neck, N.J.

[22] Filed: Jan. 23, 1974

[21] Appl. No.: 435,733

[52] U.S. Cl. .......................... 123/119 E; 48/180 R
[51] Int. Cl. ............................................. F02b 33/00
[58] Field of Search ................ 123/119 E; 48/180 R

[56] References Cited
UNITED STATES PATENTS
2,899,949  8/1959  Hicks .............................. 48/180 R
3,616,274  10/1971  Eddy .............................. 123/119 E
3,682,608  9/1972  Hicks .............................. 123/119 E

*Primary Examiner*—Manuel A. Antonakas
*Assistant Examiner*—Daniel J. O'Connor
*Attorney, Agent, or Firm*—Kirschstein, Kirschstein, Ottinger & Frank

[57] ABSTRACT

A precombustion catalyst device in which a mixture of air and liquid fuel particles successively pass through a pair of spaced screens having surfaces of different catalytic metals such as cadmium and nickel. The screens are held in closely spaced relationship from one another and spaced from ground by gaskets. Such devices are shown and described in U.S.L. Pat. Nos. 2,899,949 and 3,682,608. Pursuant to the present invention the gaskets, unlike the previously employed gaskets, contain an electrolyte, preferably one providing anions, for example, glycerol, the gaskets thereby forming high resistance paths between the screens and between each screen and engine ground. The resistance value of each path is in the order of 1 to 50 × $10^6$ ohms. This change in gaskets has been found to improve the operation of the previous precombustion catalyst devices, making the same more reliable, raising previously obtained gasoline mileage improvement, and further reducing pollutants and lowering octane ratings without causing knocking.

35 Claims, 5 Drawing Figures

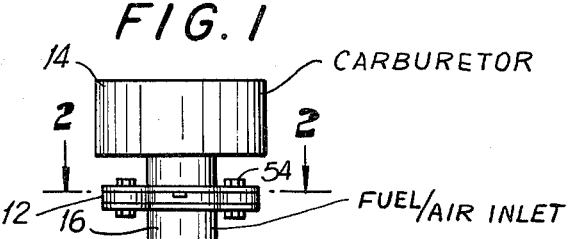
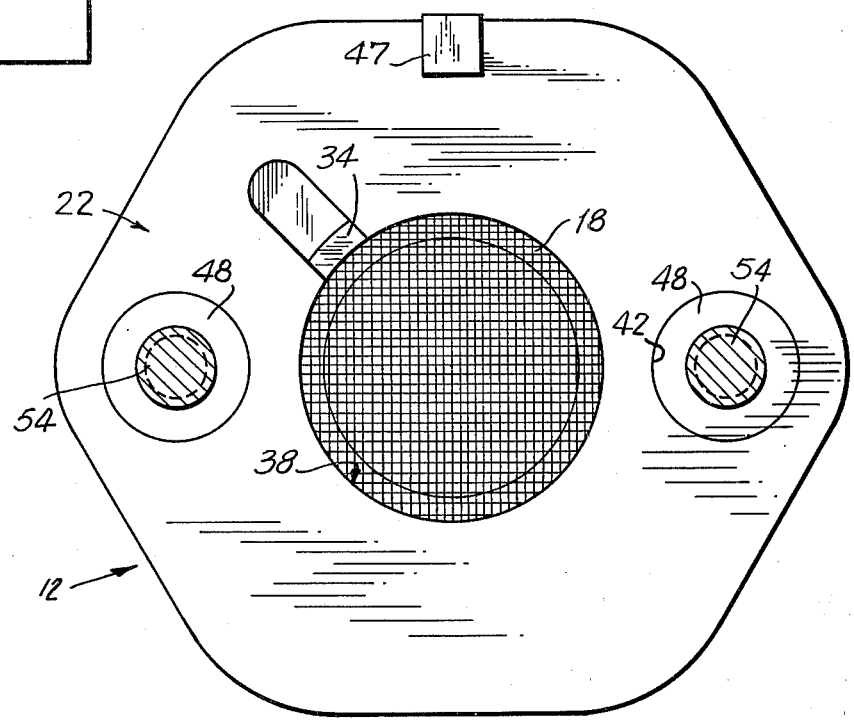
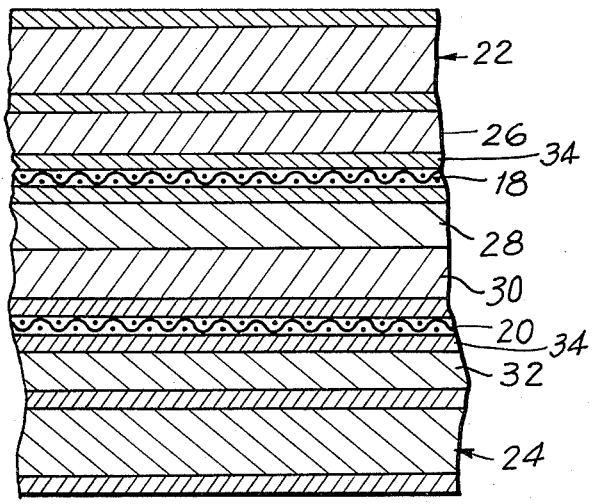
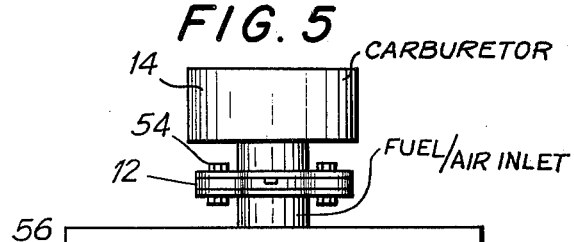

PRECOMBUSTION CATALYST DEVICE FOR USE WITH AN INTERNAL COMBUSTION ENGINE EMPLOYING A VAPORIZABLE LIQUID FUEL AND AN ENGINE UTILIZING SUCH A DEVICE

BACKGROUND OF THE INVENTION

1. Field of the Invention

A device which, through catalytic action on a carbureted mixture of a volatilizable liquid fuel and air just prior to introduction into the intake of an internal combustion engine, preconditions the mixture for more efficient ignition.

2. Description of the Prior Art

U.S.L.Pat. No. 2,899,949 discloses a precombustion catalyst device interposed between a carburetor outlet and an engine intake. The device constitutes a pair of screens of different catalytic metals, specifically cadmium for the upstream screen and nickel for the downstream screen. U.S.L.Pat. No. 3,682,608 discloses an improvement over the aforesaid precombustion catalyst device, constituting the use of smaller screen openings and a dishing of the screens which increases the area of metal over which a gasoline/air mixture flows, makes the flow more tortuous, reduces or eliminates straight-through flow areas, and increases the scrubbing action of the mixture on the screens. Although these devices achieve very desirable results in terms of gasoline mileage betterment, pollutant reduction and anti-knocking, it has been found that their efficiency is reduced when the engine is cold or is operating at high loads or speeds.

SUMMARY OF THE INVENTION

1. Purpose of the Invention

It is an object of the invention to provide a precombustion catalyst device which is an improvement over the precombustion catalyst devices heretofore disclosed in that it will function under a wider range of conditions than the precombustion catalyst devices heretofore disclosed, and which is more reliable.

It is another object of the invention to provide a precombustion catalyst device which secures results superior to those obtained with the precombustion catalyst devices heretofore disclosed.

Other objects of the invention in part will be obvious and in part will be pointed out hereinafter.

2. Brief Description of the Invention

A precombustion catalyst device which is located between the carburetor outlet and the engine intake and which includes a pair of foraminous members of dissimilar catalytic metals through which a carbureted mixture of air and liquid fuel flows. The members are separated from one another and from ground by spacers such as gaskets that form a high resistance path between the members and between each member and ground, the path having a resistance in the order of 1 to $50 \times 10^6$ ohms and preferably between 3 and $8 \times 10^6$ ohms. The members are impregnated with an electrolyte, preferably an organic electrolyte with a high boiling point, e.g., at least 250°C. Good results are obtained with a high boiling alcohol such as a polyol, e.g., glycerol.

The invention consists in the features of construction, combinations of elements and arrangements of parts which will be exemplified in the devices hereinafter described and of which the scope of application will be indicated in the appended claims.

BRIEF DESCRIPTION OF THE DRAWINGS

In the accompanying drawings in which are shown various possible embodiments of the invention:

FIG. 1 is an elevational view showing the location of the precombustion catalyst device with respect to the carburetor and the fuel/air inlet of a four stroke internal combustion engine;

FIG. 2 is an enlarged top view of said device, the same being taken substantially along the line 2—2 of FIG. 1;

FIG. 4 is a highly enlarged view taken substantially along the line 4—4 of FIG. 3; and FIG. 5 is a view similar to FIG. 1 but illustrating the device employed in connection with a two stroke internal combustion engine.

DESCRIPTION OF THE PREFERRED EMBODIMENT

Figure 3:
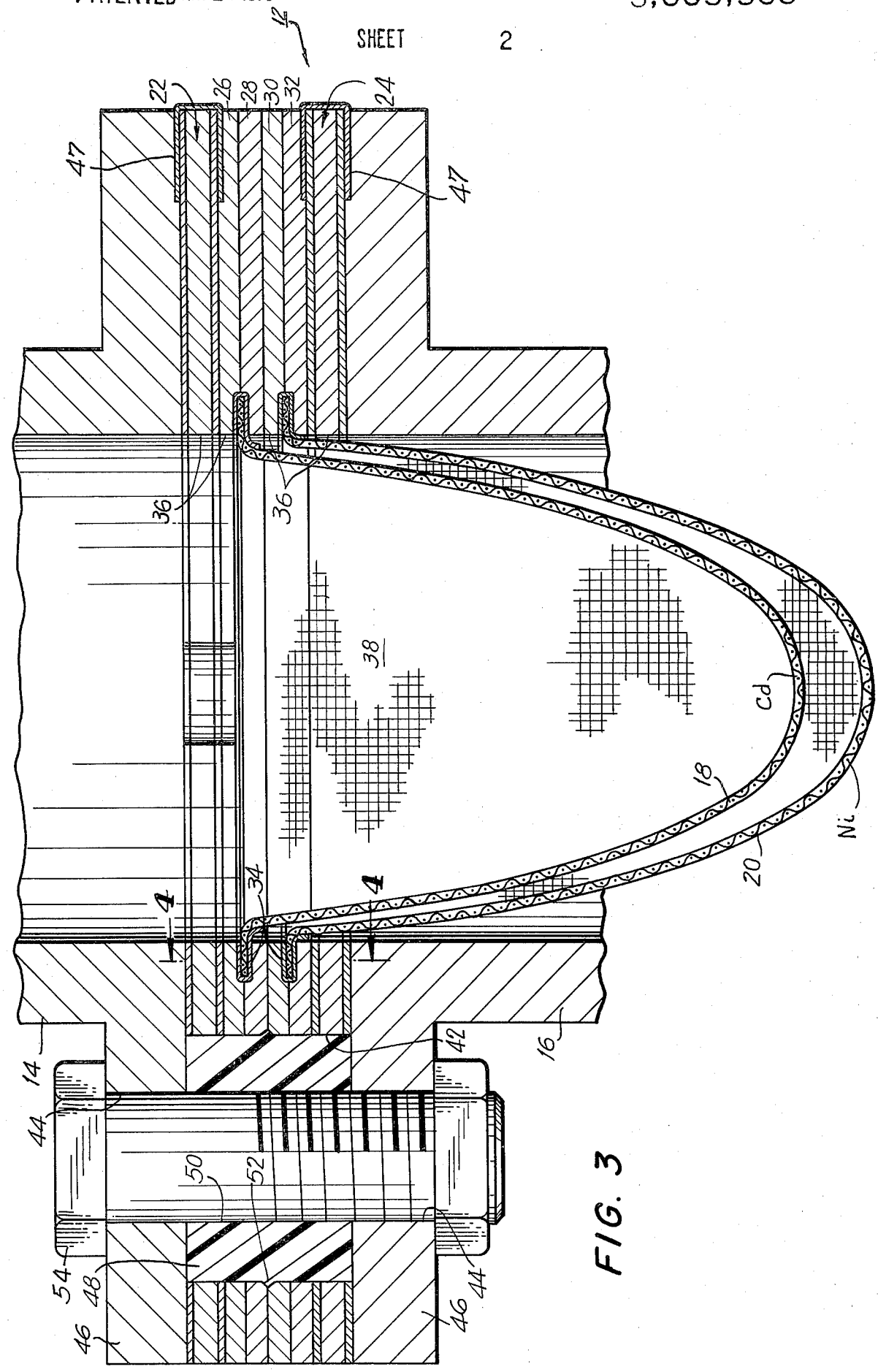
FIG. 3 is a further enlarged longitudinal central cross-sectional view of the device showing the same in greater detail.

With the prior precombustion catalyst devices such as those described in U.S.L.Pat. No. 3,682,608, it has been observed that to obtain a catalytic effect the two catalytic screens had to be effectively electrically isolated from one another and from ground which is the engine block. It further has been observed that under some conditions the previous precombustion catalyst devices lost effectiveness. This occurred at cold engine starting and at high throttle settings, e.g. when the engine was operating under heavy loads or at high speeds. As a result of considerable experimentation, it was ascertained that when the resistance between the catalytic screens was too low, for example, below $1 \times 10^6$ ohms, the screens tended to become coated with carbon and the precombustion catalytic devices essentially useless. On the other hand, it was observed that when the resistance between the screens or from screens to ground was too high, for example, over $50 \times 10^6$ ohms, the precombustion catalyst devices had only a marginal effect on engine operation. It also was observed that when the precombustion catalyst devices used heretofore provided improved engine operation the voltage between the cadmium screen and engine ground always was negative, varying from about −0.05 to as much as −0.5 volts during normal engine operation after temperature equilibrium had been reached in the engine. The nickel screen was more stable, but, it too was observed to vary from about −0.1 to about +0.5 with respect to engine ground. The voltage differential during effective operation of prior precombustion catalyst devices, that is to say, the difference in voltage between the two screens, was about from 0.05 to about 0.15 volts. When the resistance between screens or between screens and engine ground exceeded $50 \times 10^6$ ohms the voltage on the individual screens varied much more. At times, the cadmium screens exceeded an average of 12 volts, and the nickel screens went as high as an average of 2 volts. Indeed, at times, the cadmium screen became more positive than the nickel screen, and when this continued for a period of time exceeding upwardly of a few minutes (depending on the engine temperature--longer for higher temperature), the nickel screen blackened and the effect of the precombustion catalyst device on engine operation ceased.

It was discovered that when hydroxyl ions (OH⁻) were present in the intermediate gasket layers between the catalyst screens and between the screens and ground in an amount to provide a resistance of between about $1 \times 10^6$ to about $25 \times 10^6$ ohms the precombustion catalyst device was not subject to the aforesaid voltage fluctuations on the screens or to the voltage reversals of the screens, and that the precombustion catalyst devices operated in a highly stable fashion maintaining a voltage differential between screens of about 0.1 to about 0.3 volts depending on various parameters such as motor speed and load, and were not seriously deleteriously affected during starting of a cold engine or by a high throttle setting, nor did the screen voltage reverse, the nickel screen consistently remained more positive than the cadmium screen.

The reason that permeation of the intermediate gasket layers with an hydroxyl ion-containing electrolyte creates this desirable conformity of result is not known. It may be due to the encouragement of combustion by an alcohol reaction rather than by an aldehyde degradation, the former being somewhat slower and therefore more complete and less prone to cause preignition. An alcohol reaction, as exemplified by a nickel-cadmium battery or a nickel-cadmium fuel cell, depends upon movement of hydroxyl ions, and it may be that the hydroxyl ions in the electrolyte of the intermediate gasket layers of the new precombustion experience an analogous movement that steer the fuel combustion toward an alcohol reaction. Although the desired effect of increasing gas mileage, reducing pollutants and bettering anti-knock is observed in the indicated range of $1 \times 10^6$ to $50 \times 10^6$ ohms, better results are secured between about $3 \times 10^6$ to about $8 \times 10^6$ ohms, with a range of about $6 \times 10^6$ to $8 \times 10^6$ ohms when the engine has warmed up.

In the range of $3 \times 10^6$ to $8 \times 10^6$ ohms not only is stability of catalytic action observed but average gasoline mileage was seen to increase gasoline mileage by about 15 to 40 percent over the previous precombustion catalyst devices, and reduction in the engine octane requirements went from about 5 for the previous precombustion catalyst devices to about 8 for the precombustion catalyst device of the present invention.

A further observable change in the effect of the precombustion catalyst device of the present invention over the previous ones is the ability to further advance the timing, which formerly could be advanced by about 1° over a conventional 8° advance setting for regular gasoline when the engine formerly required premium gasoline. The precombustion catalyst device of the instant invention can run at a timing of as much as 13° advance for regular gasoline when the engine formerly required premium gasoline, without ping, this being a considerable factor it is believed in lowering the requirement for engine octane rating of the gasoline used. The foregoing appears to corroborate the belief that the present precombustion catalyst device is steering the reaction path toward an alcohol reaction which resists extremely rapid oxidation and thereby reduces the tendency of the air/fuel mixture to detonate prematurely. Such difference in rates of the two different reactions, i.e. between the alcohol and the aldehyde, is know in the art (see "Fuel and Combustion" by Smith and Stinson, page 134).

All the foregoing voltages were measured with a D.C. volt/ohmmeter, an FET 310 made by Triplett, having a constant resistance of 11 megohms. The volt/ohmmeter was read on the one megohm scale with a negative terminal of the meter contacting the cadmium cup and the positive terminal contacting the nickel cup for measuring the resistance between cups, the resistance from the cadmium cup to engine ground being measured by contacting the negative terminal of the meter to the cadmium cup and the positive terminal to engine ground and the resistance from the nickel cup to the engine ground being measured by contacting the negative terminal of the meter to engine ground and the positive terminal to the nickel cup.

Other pairs of catalytic metals can be used but cadmium and nickel are believed to be the catalytic metals of choice. Alternate pairs are $Zn^-/Ni^+$, $Zn^-/Cd$, $Zn^-/Cu$ and $Cd^-/Cu$. Although the screens could be made entirely of the metals indicated, it is more economical and appears to have no noticeable effect on operation to form the screens of a base metal, for example, steel, coated with the catalytic metal as by electroplating, sputtering or bath deposition. A thin coating, e.g. as little as 0.0001 inch, is satisfactory.

Excellent results are obtained where the screens are of substantially the same configuration and are spaced apart about 3 millimeters in the direction of flow or the fuel/air mixture.

The hydroxyl-containing electrolyte which impregnates the intermediate gasket layers preferably is an alcohol which can be monohydric or polyhydric, desirably the latter, the hydroxy moiety or moities being at a termination or terminations and the alcohol having a boiling point of at least 250° C, so that any tendency of the electrolyte to dissipate will be minimal, and the electrolyte will, in effect, remain sealed in the gaskets for upwards of 50,000 miles of use. As indicated previously, the preferred electrolyte is glycerine (glycerol).

In order to somewhat alleviate the effect of engine heat on the intermediate gasket layers that separate the catalytic screens from ground and from one another, the precombustion catalyst device of the present invention desirably includes shielding top and bottom endmost gasket layers which have a low coefficient of heat conductivity and are resistant to heat. Such protective gasket layers have a very high resistivity so that they desirably are bridged with electrically conductive straps whereby the adjacent hydroxyl-containing intermediate gasket layers are provided with a low resistivity connection to ground. These endmost gasket layers are interposed between the glycerine containing intermediate gasket layers and ground, so that the grounding of the endmost gasket layers and more specifically of the outer faces of such endmost gasket layers does not entail grounding of the abutting intermediate gasket layers since the resistance of the endmost gasket layers still is interposed between the intermediate gasket layers and engine ground. It was observed that the glycerine content of the glycerine-containing intermediate gasket layers did not greatly affect the resistance of the intermediate gasket layers. For example, if sufficient glycerine is impregnated in the intermediate gasket layers to provide a gasket layer resistance of about $7 \times 10^6$ ohms, doubling the glycerine content only lowers the resistance slightly. Nor does the variation of the resistance between the screens and the variation of the resistance from screens to engine ground greatly affect the effectiveness of the precombustion catalyst device of the present invention, providing, of course, that such resistance is within the ranges previously indicated, that is to say, desirably within the preferred range of about $3 \times 10^6$ ohms to about $8 \times 10^6$ ohms.

Referring now to FIG. 1, the reference numeral 10 denotes a conventional four stroke internal combustion engine with which there is associated a precombustion catalyst device 12 embodying the present invention. The device 12 is interposed between a carburetor 14 and a fuel/air inlet 16 to the engine. Specifically the precombustion catalyst device is interposed between the outlet of the carburetor 14 and the inlet to the engine intake manifold (not shown). The carburetor includes the usual air-control valve (not shown) and means for regulating the supply of fuel to the mixing chamber of the carburetor. The fuel for the engine 10 is of a type customarily utilized in everyday practice, to wit, gasoline, which is a blend principally composed of various vaporizable liquid hydrocarbons. The blends which are employed as gasoline constitute a broad spectrum of hydrocarbons answering the foregoing general description. By way of example, it may include iso-octane, a hydrocarbon of high anti-knocking value, 100 on the octane scale, and normal heptane, a hydrocarbon of a low anti-knocking value which is zero on the octane scale. Merely to typify how such a blend is rated insofar as octane numbers are concerned, a mixture of ten parts of heptane and ninety part of iso-octane has an octane number of 90 which would be lower than the octane number of a so-called "regular" gasoline which has an octane number of about 94. A premium gasoline which is used usually in a high compression four stroke internal combustion engine may require an octane number of about 99 to 100 more. There are commercially available a range of different octane numbers which are conventionally characterized by different trade desginations that may vary from company to company. In general, the lower the octane number, the less expensive is the gasoline and the more desirable it is to purchase providing that the engine can use it without difficulty.

All of these gasolines are capable of being sprayed in the form of small particles into an air stream, e.g. in the carburetor, where they will largely evaporate to create a mixture that is suitable for feed to the intake manifold of an internal combustion engine.

The fuel, after partial vaporization and reduction of the remainder to minute droplets and after mixing with air and passage of the mixture to the outlet of the carburetor, instead of flowing directly to the engine intake manifold as in normal practice, is passed through the precombustion catalyst device 12 embodying the present invention. The construction of the thusly-placed precombustion catalyst device is the subject of the present invention.

Said device includes two catalytic foramimous members in the form of wire cloths 18, 20. The wire cloth 18 is upstream of the wire cloth 20, so that the wire cloth 18 first contacts and passes the fuel/air mixture which then moves down to and through the wire cloth 20.

Each cloth includes a base wire cloth, preferably one having a good thermal conductivity and fabricated of an inexpensive suitable metal such as iron or steel. The cost of the base wire cloth is not a critical factor. Availability also is important. More desirable metals for the base wire cloth are copper and aluminum and alloys thereof due to their better heat conductivity. The cloths, desirably, are of a very fine mesh. The upstream wire cloth 18 is typically of a mesh size which is 28 by 28 with a 0.0085 inch diameter wire and, therefore, about 800 openings per square inch. The downstream cloth 20 is typically of 16 by 16 mesh with a 0.011 inch diameter wire and thus has in the order of 250 openings per square inch.

A suitable range of mesh size for the wire cloths is from about 10 by 10 mesh to about 100 by 100 mesh with wire diameters from about 0.02 inch to about 0.01 inch for the coarsest mesh, and from about 0.0085 inch to about 0.003 inch for the finest mesh. At very fine mesh sizes, to prevent frosting, it may be desirable to supply an external source of heat. The precentage of open area in a direction perpendicular to the plane of the mesh may vary for the cloths from about 50 percent to about 75 percent.

As indicated previously, the cloths may be made entirely of the catalytic material, but as a matter of economy it is less expensive and just as functionally effective to employ common metals for the base metal cloths and to coat them with catalytic materials. The catalytic materials employed include those which are know as hydrogen ion-forming catalysts. Typical such catalysts are cadmium and nickel, the upstream cloth 18 presenting an external surface of cadmium and the downstream cloth 20 presenting an external surface of nickel. It has been found that coatings as thin as 0.0001 inch of any of these catalytic metals, applied as by electroplating or immersion on a pre-formed base wire cloth, will function satisfactorily. Alternatively and desirably, the catalytic coating can be placed on a base wire which is oversized and the wire then drawn down to its desired diameter for weaving, thus effecting a concurrent reduction in diameter of the base wire and of the catalytic coating. The thickness of the coating then may be in the order of a ten-thousandths of an inch and still will be effective for the purpose of the precombustion catalytic device.

Each of the two wire cloths extends completely across the passageway through the device 12 connecting the discharge throat of the carburetor to the entrance of the intake manifold so that it is not possible for the fuel/air mixture to by-pass these cloths. In other words, said mixture is constrained to flow through both cloths, one after the other. It is within the ambit of the invention to by-pass some of the fuel/air mixture but this would lessen the advantages obtained by the invention and therefore, preferably, the entire mixture is constrained to flow through the two wire cloths in succession.

Both wire cloths are dished, a suitable configuration being as indicated. The wire cloths are similarly dished and they are placed in such positions that they are uniformly spaced apart. A desirable spacing in the directional flow of the air/fuel mixture is about 3 millimeters.

It is necessary for the precombustion catalyst device to include suitable means for supporting the two spaced wire cloths in their aforesaid positions completely spanning the passageway between the carburetor and the intake manifold and, preferably, to integrate the cloths into a single unit for easier handling and installation. For this purpose there is provided a gasket construction as shown in FIG. 3 and in more detail in FIG. 4. The physical structuring of the gasket illustrated in FIG. 3 may be the same as that shown in U.S.L.Pat. No. 3,682,608, except for the electrical characteristics of the gasket layers and the impregnation thereof, as indicated previously. Nevertheless, for the sake of completeness, the physical structuring will be detailed.

The gasket includes a top shielding layer, which may be referred to as a top cover 22, and a bottom shielding layer, which may be referred to as a bottom cover 24. The shielding performed by these two layers is heat shielding. Both of these layers are formed in a manner which will be detailed subsequently, so that they have a high coefficient of resistance to the transmission of heat and are inert to the temperatures prevailing in an operating internal combustion engine at the carburetor outlet. Between the top cover 22 and the bottom cover 24 are disposed four intermediate gasket layers 26, 28, 30 and 32. The intermediate gasket layer 26 as shown in FIG. 3 is the uppermost. It is the gasket layer which is above (upstream of) the upstream wire cloth 18. The second intermdiate gasket layer, the one downstream of the uppermost gakset layer 26, is the gasket layer 28. This is directly beneath the outturned flat peripheral zone of the upstream cadmium cloth 18. The next, i.e. third intermediate gasket layer is the layer 30 which is directly above the outturned flat peripheral zone of the nickel downstream cloth 20. The last intermediate gasket layer, which is the layer directly above the bottom cover 24 and which is below the outturned flat peripheral zone of the nickel cloth 20, is identified by the numeral 32. The adjacent intermediate gasket layers are in mutual face-to-face contact.

The two cover layers, that is to say, the top cover 22 and bottom cover 24, in the device 12 being described, have a very high electrical resistance. This, however, has no bearing upon the operation of the present invention, it is merely inherent in the composition employed to obtain high resistance to the transmission of heat. A low resistance would function satisfactorily if its heat resistivity were acceptably high. The compositions of the two cover layers are the same, hence, only one will be described.

Each cover gasket layer is divided into three plane face-to-face contacting sublayers, to wit, a top and bottom cover sublayer and a core cover sublayer which have not been identified by reference numerals in the drawings.

The top and bottom sublayers of each cover layer are fabricated from cured nitrile rubber sheet packing blended with a small percentage of granulated cork to provide better conformability for the rubber and are reinforced with mineral fibers for heat resistance and good torque retention and a small percentage of vegetable fibers such as hemp and jute for flexibility. It is to be stressed at this point that these top and bottom sublayers, and indeed, all of the sublayers of both gasket covers, do not contain any noticeable amount of electrolyte, specifically, no glycerine, as is present in the intermediate gasket layers and which will be described hereinafter.

The core cover sublayer is fabricated from a phenol-formaldehyde resin reinforced fiberboard which typically will constitute wood fiber and, optionally, hemp and/or jute. This core cover sublayer likewise contains no electolyte. Preferably the cover gasket layers are relatively impervious to the electrolyte, that is to say, glycerine, so that the glycerine, soon to be described as present in the intermediate gasket layers, will not tend to migrate into the cover layers and thus be lost to the intermediate gasket layers. Such migration will not affect the operation of the device to the extent that if some glycerine is present in the gasket cover layers the device nevertheless will function effectively. However, it is desired to discourage such migration because there will be a corresponding loss of glycerine in the adjacent intermediate gasket layers and the loss could be so great the resistance of the intermediate gasket layers which, if substantial amounts of glycerine are depleted therefrom, will deleteriously affect operation of the precombustion catalyst device.

The principal element of novelty of the present invention resides in which, intermediate gasket layers as a part of this device and, specifically, in their resistances and the impregnation thereof with an electrolyte, desirably one containing hydroxyl ions. In particular, in a preferred form of the invention, each intermediate gasket layer is similarly constructed, although, optionally, as well be pointed out hereinafter, they may be of different thickness. Thus, an intermediate gasket layer is fabricated from a glue/glycerine fiber sheet packing. The packing typically constitutes a harsh all-vegetable fiber paper sheet such, for example, as a sheet of unbleached sulfate wood pulp to provide body, i.e. to act as a filler. This sheet is saturated with a high-test, e.g. 315 grams Bloom, hide glue which is plasticized with glycerine and which after saturation, is treated with formaldehyde to tan, that is to say, to insolubilize, the hide glue which now saturates the fiber sheet. A typical constitution for an intermediate gasket layer is about 59 percent paper, about 7 percent animal glue, about 29 percent glycerine, and about 5 percent water. The glycerine in the sheet, primarily due to its hydroscopicity, retains moisture and thereby accomplishes softening or plasticizing of the hide glue. The moisture held by the glycerine also plasticizes, i.e. softens, the fibers constituted by the wood pulp. The amount of glycerine is not highly critical. A variation of plus or minus about 5 percent has not been found to affect the operation of the new precombustion catalyst device 12.

The amount of glycerine used to impregnate the intermediate gasket layers preferably is such as to create a resistance in each of these layers of from about $3 \times 10^6$ to about $8 \times 10^6$ ohms and, as indicated previously, small variations, e.g. in the order of minus about 20 percent to plus about 100 percent in the glycerine impregnation content, has not been found to noticeably affect the operation of the device.

The outturned flat peripheral zones of the two wire cloths 18, 20 desirably are stiffened, that is to say, reinforced, by crimping around each of said peripheries a thin annulus of metal such, for instance, as stainless steel or soft steel plated with a metal the same as the associated screen, which is of U-shaped cross-section with the base of the U facing outwardly. These crimped annular rings have been indicated by the reference numerals 34.

For the sake of appearance, the covers and intermediate layers have the same peripheral configurations and are stacked in registration. They are formed with a registered set of central openings 36 that jointly form a central passageway 38. The periphery of the wire cloth 18, this being the upstream cadmium cloth and the associated metal annulus are located between the intermediate gasket layers 26, 28. The periphery of the downstream nickel cloth 20 and its associated metal annulus is positioned between the intermediate gasket layers 30, 32. As will be apparent, the peripheries of these cloths are located adjacent the central passageway 38, or, more specifically, slightly outwardly of the passageway.

The configurations of the stacked cover and intermediate gasket layers and the configuration of the central passageway, as well as the dimensions of the foregoing, are determined by and conform to the configuration and dimensions of the carburetor outlet and engine air inlet of any particular engine with which the precombustion catalyst device 12 is designed to be used.

The stack constituted by the covers 22, 24 and the intermediate layers 26, 28, 30, 32 forms a gasket. This stack includes mounting openings 42, the positons of which will be determined by the corresponding mounting openings 44 in the flanges 46 of the carburetor outlet and the engine air inlet.

The mounting openings 42 receive electrically nonconductive bushings 48, having central bores 50. The bushings 48 to serve to control the subsequent compression of the gasket layers; they also minimize the torque loss and heat conductivity of the finished device. In addition, for the same purpose of holding the covers and intermediate layers together, a very thin layer (not shown) of bonding material is interposed between the facing abutting surfaces of the cover and intermediate layers.

When the precombustion catalyst device is manufactured, the covers and intermediate layers are stacked in the indicated relationship with the cadmium and nickel cloths 18 and 20 properly positioned and with the bushings 48 located int the registered mounting openings 42. At this time the total height of the stack constituting the cover and intermediate layers is somewhat higher than the heights of the bushings 48. Next, during the manufacture, the stack of covers and intermediate layers are compressed to a thickness somewhat in excess of the lengths of the bushings. Such compression forces the covers and intermediate layers into close mutual contact and, upon drying of the bonding between these layers, forms them into a compact unit. Moreover, the bushings are slightly oversized with respect to the mounting openings so that all of the elements of the assembly are tightly held to one another. To assist in retaining the bushings in place, each bushing is provided with a circumferential V-shaped rib 52 intermediate its length. This enables the bushing to resist a substantial longitudinal stress without being displaced. A material which exemplificatively can be employed for the bushings 48 is a thermo-set phenolformaldehyde resin reinforced with mineral fibers.

The location of the openings 42 and the locations, sizes, and number of bushings 48 employed will be such as to conform to that necessary for the particular carburetor and engine with which the precombustion catalyst device is to be used. The device 12 is held in place with nuts and bolts 54 that extend through the bushings.

It bears mentioning, that, despite the fact that different intermediate gasket layers are of different thickness, for example, some are approximately twice as thick as the others, the resistances through these layers are approximately the same, being between about $3 \times 10^6$ to about $8 \times 10^6$ ohms.

It will be recalled that the resistance between any screen and the engine block ground should be of the same order of magnitude. This resistance would be considerably exceeded due to the presence of the top and bottom gasket covers 22, 24 which, because of their composition, inherently have a much higher resistance than the maximum of the usable range. To prevent this high resistance from interfering with the proper operation of the precombustion catalyst device 12, shorting straps 47 are employed for both of the covers. The shorting straps are of electrically conductive material, for instance, steel, and are in the form of U-shaped clips with one leg above and one leg beneath each cover layer and with the base of the clip bridging the periphery of the cover layer at a local zone. It is not necessary to make these clips of a highly electrically conductive metal inasmuch as the order of magnitude of resistance of the intermediate gasket layers is so high that the additional resistance which is presented by the strip, if it is steel instead of copper makes no noticeable difference. The desired area of the clips within the gasket appears to be a rough function of the displacement of the engine, e.g. about 0.2 square inches for 100 cubic inches to about 0.5 square inches for 500 cubic inches. The top and bottom surfaces of the top and bottom gasket covers, respectively, are flat to conform to the normally flat surfaces of the flanges at the discharge throat of the carburetor and the entrance to the intake manifold.

The precombustion catalyst device of the present invention constitutes a substantial improvement over the device illustrated in U.S.L.Pat. No. 3,682,608, the percentage of failures being greatly reduced and the effectiveness of the device being substantially greater than the previous one. This, as noted previously, constitutes an increase of approximately 15 to 40 percent in gasoline consumption and an additional lowering of approximately 3 in required octane rating for no-knock performance of an engine.

Another highly important and interesting application of the precombustion catalyst device of the present invention was observed. The principal advantages of a device of the character of the present invention are, as mentioned heretofore, increase in miles per gallon, reduction of pollutants, and reduction in engine octane requirements. All of these were observed in connection with a four stroke internal combustion engine 10. When the precombustion catalyst device of the present invention was interposed between the carburetor and engine air intake inlet of a two stroke internal combustion engine 56, a totally unexpected unique result was observed. As is known, in a two stroke internal combustion engine the gasoline used as fuel has added thereto lubricating oil the purpose of which is to lubricate the cyliner walls. This lubricating oil is not largely combusted during operation of such an engine and, therefore, when these engines are employed in outboard motors the oil in the engine exhaust pollutes the water in which the boat is operated. This has been a major deterrent factor in the sales of two cycle marine engines and, indeed, at the present time many landbound bodies of water are not permitted to have two stroke internal combustion engines operate on the same. When the precombustion catalyst device of the instant invention is, however, employed between the carburetor and the engine air intake, unexpectedly the oil substantially disappears from the engine exhaust so that it no longer pollutes the water in which a boat operates.

It thus will be seen that there is provided a precombustion catalyst device for use in an internal combustion engine employing a vaporizable liquid fuel which device achieves the several objects of the present invention and is well adapted to meet the conditions of practical use.

As various possible embodiments might be made of the above invention and a various changes might be made in the embodiment above set forth, it is to be understood that all matter herein described or shown in the accompanying drawings is to be interpreted as illustrative and not in a limiting sense.

Having thus described the invention, there is claimed as new and desired to be secured by Letters Patent:

1. A precombustion catalyst means for interposition between the carburetor and the engine intake of an internal combustion engine employing a vaporizable liquid fuel, said means comprising a pair of spaced foraminous members of dissimilar catalytic metals and a gasket supporting said members spaced from one another and spaced from the carburetor and from the engine intake, said gasket providing a resistance between said members and between each member and engine ground in the order of $1 \times 10^6$ to $50 \times 10^6$ ohms.

2. A precombustion catalyst means as set forth in claim 1 wherein the gasket contains an electrolyte in the electrical path between the members and between each member and engine ground.

3. A precombustion catalyst means as set forth in claim 2 wherein the electrolyte provides anions.

4. A precombustion catalyst means as set forth in claim 3 wherein the anions are hydroxyl anions.

5. A precombustion catalyst means as set forth in claim 4 wherein the electrolyte is an organic liquid.

6. A precombustion catalyst means as set forth in claim 5 wherein the electrolyte has a boiling point of at least 250°C.

7. A precombustion catalyst means as set forth in claim 6 wherein the electrolyte is an alcohol.

8. A precombustion catalyst means as set forth in claim 7 wherein the alcohol is polyhydric.

9. A precombustion catalyst means as set forth in claim 6 wherein the electrolyte is a polyol.

10. A precombustion catalyst means as set forth in claim 5 wherein the electrolyte is glycerine.

11. A precombustion catalyst means as set forth in claim 2 wherein the resistance provided by the gasket is between about $3 \times 10^6$ to $8 \times 10^6$ ohms.

12. A precombustion catalyst means as set forth in claim 2 wherein the gasket includes upper and lower cover layers having a low coefficient of heat conductivity.

13. A precombustion catalyst means as set forth in claim 12 wherein the cover layers are resistant to heat.

14. A precombustion catalyst means as set forth in claim 12 wherein the cover layers are substantially impervious to the electrolyte.

15. A precombustion catalyst means as set forth in claim 14 wherein the cover layers have a very high resistivity and means is provided to electrically shunt each of said layers.

16. A four cycle internal combustion engine having a carburetor, a fuel/air intake and a pre-combustion catalyst as set forth in claim 1 between the carburetor outlet and the fuel/air intake.

17. A two cycle internal combustion engine having a carburetor, a fuel/air intake and a pre-combustion catalyst as set forth in claim 1 betweeen the carburetor outlet and the fuel/air intake.

18. A precombustion catalyst means for interposition between the carubretor and the engine intake of an internal combustion engine employing a vaporizable liquid fuel, said means comprising a pair of spaced foraminous members of dissimilar catalytic metals and a gasket supporting said members spaced from one another and spaced from the carburetor and from the engine intake, said gasket containing an electrolyte in the electrical path between the members and between each member and engine ground 19. A pre-combustion catalyst means as set forth in claim 18 wherin the electrolyte provides anions.

20. A pre-combustion catalyst as set forth in claim 19 wherein the anions are hydroxyl anions.

21. A pre-combustion catalyst as set forth in claim 20 wherein the electrolyte is an organic liquid.

22. A pre-combustion catalyst as set forth in claim 21 wherein the electrolyte has a boiling point of at least 250°C.

23. A pre-combustion catalyst as set forth in claim 22 wherein the electrolyte in an alcohol.

24. A pre-combustion catalyst as set forth in claim 23 wherein the alcohol is polyhydric.

25. A pre-combustion catalyst as set forth in claim 22 wherein the electrolyte is a polyol.

26. A pre-combustion catalyst as set forth in claim 21 wherein the electrolyte is glycerine.

27. A pre-combustion catalyst as set forth in claim 18 wherein the gasket includes upper and lower cover layers having a low coefficient of heat conductivity.

28. A pre-combustion catalyst as set forth in claim 27 wherein the cover layers are resistant to heat.

29. A pre-combustion catalyst as set forth in claim 27 wherein the cover layers are substantially impervious to the electrolyte.

30. A pre-combustion catalyst as set forth in claim 29 wherein the cover layers have a very high resistivity and means is provided to electrically shunt each of said layers.

31. A pre-combustion catalyst as set forth in claim 18 wherein the gasket includes an upper and a lower cover layer of high resistivity and a low coefficient of heat conductivity, and at least three intermediate layers between the cover layers, said layers being stacked and having at least one passageway therethrough defined by the spaced foraminous members, one intermediate layer being disposed between a cover layer and the peripheral zone of a foraminous member, at least one intermediate layer being disposed between the peripheral zones of the foraminous members and one intermediate layer being disposed between the peripheral zone of the other foraminous member and the other cover layer, means to electrically shunt each of the cover layers, the intermediate layers being impregnated with electrolyte to impart a resistance between said members and between each member and engine ground in the order of $1 \times 10^6$ to $50 \times 10^6$ ohms.

32. A pre-combustion catalyst as set forth in claim 31 wherein there are at least four intermediate layers, at least two of said intermediate layers being disposed between the peripheral zones of the foraminous members.

33. A pre-combustion catalyst as set forth in claim 31 wherein the resistance imparted by the intermediate layers is between about $3 \times 10^6$ and $8 \times 10^6$ ohms.

34. A four cycle internal combustion engine having a carburetor, a fuel/air intake and a pre-combustion catalyst as set forth in claim 18 between the carburetor outlet and the fuel/air intake.

35. A two cycle internal combustion engine having a carburetor, a fuel/air intake and a pre-combustion catalyst means as set forth in claim 18 between the carburetor outlet and the fuel/air intake.

* * * * *